(12) United States Patent
Müller et al.

(10) Patent No.: US 6,474,306 B2
(45) Date of Patent: Nov. 5, 2002

(54) METHOD AND ARRANGEMENT FOR SENSOR DIAGNOSIS

(75) Inventors: Jan Müller, Säve (SE); Peter Möller, Mölndal (SE)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 09/683,207

(22) Filed: Nov. 30, 2001

(65) Prior Publication Data

US 2002/0035866 A1 Mar. 28, 2002

Related U.S. Application Data

(63) Continuation of application No. PCT/SE00/01056, filed on May 25, 2000.

(51) Int. Cl.⁷ .............................................. G01M 15/00
(52) U.S. Cl. ...................... 123/479; 123/295; 73/117.3; 73/118.1
(58) Field of Search ................................ 123/479, 295; 73/117.3, 118.1

(56) References Cited

U.S. PATENT DOCUMENTS

| 4,546,647 A | | 10/1985 | Takahashi |
| 4,960,087 A | | 10/1990 | Junginger et al. |
| 5,168,854 A | * | 12/1992 | Hashimoto et al. ..... 123/406.17 |
| 5,493,902 A | * | 2/1996 | Glidewell et al. ........... 123/479 |
| 6,012,438 A | * | 1/2000 | Joos et al. ............... 123/198 D |
| 6,032,639 A | * | 3/2000 | Goto et al. ................... 123/295 |
| 6,283,108 B1 | * | 9/2001 | Matsufuji et al. ........... 123/458 |

FOREIGN PATENT DOCUMENTS

| FR | 2541456 A1 | 8/1984 |
| JP | 63-143383 A | 6/1988 |

* cited by examiner

*Primary Examiner*—Erick Solis
(74) *Attorney, Agent, or Firm*—Howrey, Simon, Arnold & White LLP

(57) ABSTRACT

The invention relates to a method for the diagnosis of a sensor in connection with control of a combustion engine. The method includes feeding fuel under pressure (p) to the engine, detecting the pressure (p) by means of the sensor, and controlling the air/fuel mixture based on to the operating state of the engine. The invention involves an intentional modification of both the pressure (p) and injection time period ($t_{inj}$) during which fuel is fed to the engine. The modifications are selected in such a way that substantially no change in the fuel flow (F) to the engine is obtained. A check is performed to determine if the modifications of the pressure (p) and injection time period ($t_{inj}$) result in any unallowable deviation in the operating state of the engine. If so, an indication that the sensor is defective is provided. With the invention, an improved diagnosis method for checking the functioning of a fuel pressure sensor is provided.

10 Claims, 2 Drawing Sheets

METHOD AND ARRANGEMENT FOR SENSOR DIAGNOSIS

CROSS REFERENCE TO RELATED APPLICATIONS

The present application is a continuation of International Application No. PCT/SE00/01056, filed May 25, 2000, which claims priority to Swedish Application No. 9902009-1, filed Jun. 1, 1999.

BACKGROUND OF INVENTION

1. Technical Field

The present invention relates to a method and arrangement for sensor diagnosis in an internal combustion engine. More particularly, the invention relates to a method and arrangement for diagnosing a pressure sensor used for detection of the pressure of fuel fed to an internal combustion engine.

2. Background Information

A fuel pump is often utilized for feeding the fuel to the engine of vehicles driven by a combustion engine. According to conventional techniques, the fuel pump is arranged in connection with the vehicle fuel tank, and functions to feed fuel from the tank at a sufficient flow rate and a suitable fuel pressure to the engine. In doing so, the fuel supplied to the engine can be provided during the various operating states of the engine.

Fuel pumps used with conventional, port-injected gasoline engines, i.e., engines with injection devices arranged in the intake passages of each engine cylinder, are intended to maintain a fuel pressure of about 0.3 to about 0.4 MPa, or about 45 to about 60 psi. In a direct injection ("DI") engine, i.e., a DI Otto or piston type engine, each combustion chamber of the engine is arranged so that the fuel supplied can be highly concentrated around the spark plug in connection with combustion of the fuel. This arrangement or mode is commonly referred to as a "stratified" operation and allows during continuous running, for example, at a low or medium torque and/or engine speed, operation with a very lean air/fuel mixture. In particular, this type of arrangement allows the engine to run with a Lambda value ($\lambda$) up to and above about $\lambda=3$. By doing so, a reduction in fuel consumption by the engine is achieved.

The DI engine can also be operated in a "homogeneous" operation mode, with a substantially stoichiometric mixture (i.e., a $\lambda$ value of about 1 to about 1.2), or a relatively rich mixture (i.e., a $\lambda$ value of less than 1). This latter, rich operating mode normally exists in driving situations with relatively high torque and high speed of the engine.

Because fuel is injected in a very short time period during stratified operation in a DI engine (in contrast to conventional port-injected engines), a substantially higher fuel pressure is required for DI engines than for conventional engines. Therefore, in DI engines both a conventional fuel pump, arranged by the tank and operative to feed fuel at a pressure of about 0.3 to about 0.4 MPa, and a high-pressure pump, for feeding fuel to the electrically controlled injecting devices, or injectors at each cylinder, are used. The high-pressure pump typically operates at a pressure of about 5 to about 15 MPa. Thus, the fuel pressure can be varied as a function of the load, speed and operating range of the engine in question.

For controlling the pressure of the fuel supplied to each injector, a pressure sensor is used for detecting the current fuel pressure. With these pressure sensors, there is a requirement for monitoring the sensor in order to determine and indicate any malfunction of the sensor. Such a diagnosis could include a plausibility assessment. In a plausibility assessment, or "out-of-range" diagnosis, a control unit is used to control fuel pressure if the pressure measured by the pressure sensor is higher than a predetermined highest possible value or lower than a predetermined lowest possible value. If the pressure is out of range, the sensor can be considered defective.

Although reliable in principle, this diagnosis still has problems. This assessment does provide a method or means of checking the pressure sensor for defects in those cases where the currently measured data actually lies within the expected range, i.e., when the measured data lies between the highest possible value and the lowest possible value.

SUMMARY OF INVENTION

The present invention provides an improved method and arrangement for diagnosis of a fuel pressure sensor in an automotive vehicle compared to known diagnosis methods as discussed above. This is achieved by a method and arrangement involving a fuel pump for feeding fuel under pressure to the engine. A sensor is provided for detecting the fuel pressure. The air/fuel mixture provided to the engine is controlled by performing an intentional modification of both the pressure and the time period in which fuel is injected to the engine. These modifications are selected in such a way that no change in the flow of fuel to the engine occurs. A check is then performed to determine if the modifications caused any unallowable deviation in the operating state of the engine. If so, a defective pressure sensor indication is given.

With the invention, a substantial advantage is achieved in relation to conventional systems. In contrast to conventional systems, the present invention allows a plausibility test that enables any deficiencies in the sensor to be detected even though the measured data falls within an expected or normal measurement range. This provides a higher or more reliable diagnosis method.

In one embodiment of the invention, the check further includes determining whether the modifications result in any unallowable deviation in the control of feeding the air/fuel mixture to the engine. In one embodiment of the invention, the check further determines whether the pressure sensor signal falls outside of a predetermined range, or highest and lowest conceivable measurement value. In such an instance where the signal is out of range, the sensor is considered defective. In another embodiment of the invention, a check is performed to determine if a suitable operating mode of the engine exists before performing the modifications. In one embodiment of the invention, the indication of the defective sensor includes the actuation of an alarm such as a warning light.

An embodiment of the invention may also include a high pressure pump for feeding fuel to the engine. The pressure sensor is preferably arranged downstream of the high pressure pump.

BRIEF DESCRIPTION OF DRAWINGS

The invention will be described below in connection with a preferred embodiment and the enclosed drawings, in which.

DETAILED DESCRIPTION

Figure 1:
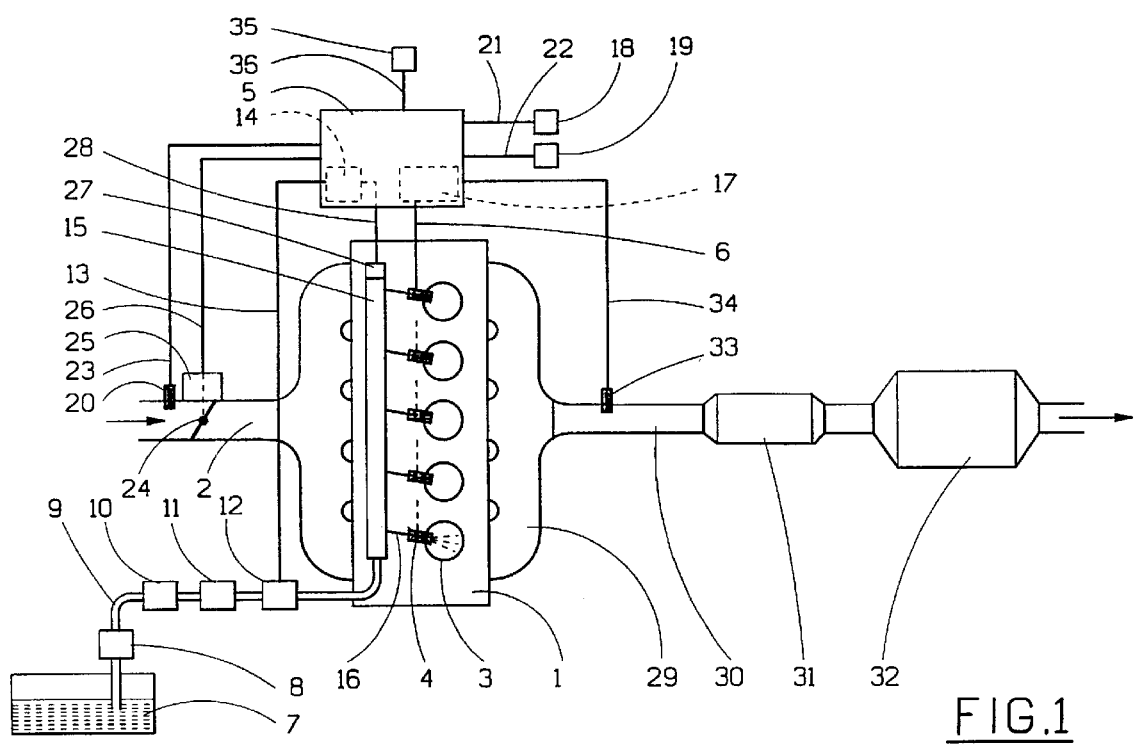
FIG. 1 is a block diagram illustrating one embodiment of an arrangement for a combustion engine by which the present engine can be utilized.

FIG. 1 provides a block diagram of an arrangement for a combustion engine 1 in which the present invention can be utilized. According to one embodiment, the invention is used for a DI engine, or direct-injected Otto type engine. However, the invention is not limited to this type of engine, but could also be used also for other types of engine such as conventional gasoline and diesel engines.

The engine 1 is preferably operable in at least two operating modes having differing amounts of air and fuel supplied to the engine 1, and different timings for injecting the fuel and igniting the air/fuel mixture. A first operating mode can consist of a "stratified" operating mode. In this mode, the supplied fuel is concentrated in the respective engine combustion chambers allowing, during certain operating conditions (primarily at relatively low speed and torque), a very lean air/fuel mixture operation in the order of up to about $\lambda=3$. The stratified operating mode is based upon fuel being injected into the engine 1 so that the fuel partially mixes with air ( i.e., non-homogeneously). By doing so, a very lean ignition mixture can be achieved. By operating in a stratified mode, a reduction in fuel consumption is achieved compared to engines operating with a stoichiometric mixture, that is where $\lambda=1$. Alternatively, during certain operating conditions with relatively high torque and speed of the engine 1, the engine 1 can be set to a "homogeneous" operating mode wherein a stoichiometric or somewhat rich air/fuel mixture is fed to the engine 1. In contrast to the air/fuel mixture applied during the stratified operating mode, this mixture is substantially evenly distributed inside the combustion chamber.

The control unit 5 is able to change between the different possible operating modes of the engine 1 independent of, e.g., driving conditions, load and rotational speed. Following, an embodiment of the invention is described whereby the engine 1 is operated in either a stratified mode or homogeneously. However, it should be understood that the invention is not limited to just these two operating modes.

Air flows into the engine 1 by way of an air inlet 2. The engine 1 has one or more cylinders 3 and a corresponding number of injecting devices in the form of electrically controlled injectors 4 for injecting fuel into each individual cylinder 3. Each injector 4 is connected to the central control unit 5 through an electrical connection 6. The control unit 5 is preferably computer based and arranged to control, in a known manner, fuel supplied to each individual injector 4 using fuel from a fuel tank 7. In doing so, an appropriately adapted air/fuel mixture is fed to the engine 1.

The engine 1 according to the invention is preferably a "multi-point" injection type, wherein the appropriate amount of fuel to the engine 1 can be individually supplied to each cylinder 3 in a known manner. As illustrated, the engine 1 has five cylinders. However, it should be understood that the invention is not limited to this embodiment, but can be used also for engines with various other numbers of cylinders and cylinder configurations. In an alternative embodiment, the invention could be utilized with engines equipped with "single point" injection, i.e., where fuel and air is fed to all the cylinders through a common inlet.

Fuel is supplied to the engine 1 from the tank 7 by means of a first fuel pump 8, functioning as a feeder pump. This feeder pump 8 preferably works at a relatively low pressure in the order of about 0.3 to about 0.4 MPa. The fuel is fed from the fuel pump 8, through a fuel line 9 via a fuel filter 10 and pulsation equalizer 11, to a second fuel pump 12 in the form of a high pressure pump 12. The fuel filter 10, pulsation equalizer 11 and high pressure pump 12 are known devices and therefore will not be described in detail here.

Due to the specific working mode of the DI engine, particularly when fuel is injected into the respective cylinders during very short periods of time, the high pressure pump 12 generates a relatively high fuel pressure in the order of about 5 to about 15 MPa. To this end, the high pressure pump 12 is connected via a connection 13 to an electronic drive unit 14, preferably included as an integrated part of the control unit 5. Through the drive unit 14, the fuel pressure is regulated according to the current operating state of the engine 1.

Fuel is metered out from the high pressure pump 12 and on to a fuel distributing device consisting of a fuel distribution pipe 15. The fuel distribution pipe 15 is in turn arranged adjacent to the engine 1 and connected to the individual injectors 4 via fuel lines 16. However, the invention is not limited to this embodiment and can also be applied to fuel distribution pipes that are integral with each injector, i.e., not having any separate attachments connecting the fuel distribution pipe with the individual injector 4.

During engine operation, the control unit 5 generally operates to control the air/fuel mixture to the engine 1 so as to adapt it to the current operating conditions. The engine control is performed in a substantially known manner, independent of various parameters reflecting the operating conditions of the engine 1 and the vehicle in question. For example, the engine control can be performed independent of the current throttle position, the engine speed, the amount of air fed to the engine and the oxygen concentration of the exhaust gases. In order to accomplish this, in one embodiment the engine 1 can be provided with a position sensor 18 for the vehicle throttle pedal (not shown), a revolution counter 19 for detecting engine speed, and an air flow meter 20 for detecting the amount of air fed into the engine 1. All such devices can be connected to the control unit 5 via corresponding electrical connections 21, 22, 23, respectively.

In one embodiment, the system can also include a throttle 24 that preferably electrically controlled and provided with a controllable actuation motor 25. With this motor 25, the throttle 24 can be set to a certain required position, allowing an appropriate amount of air to be fed into the engine 1 based upon current operating conditions. The actuation motor 25 can be connected to the control unit 5 by a further connection 26.

Fuel is metered out from each injector 4 at appropriate points in time (based on, for example, current operating conditions) through control from an injection drive 17. This injection drive unit 17 is preferably a part of or located in the control unit 5 and connected to each injector 4 via the connection 6. In this way, the injection drive unit 17 functions to supply fuel to the respective injector 4 during a certain injection time period, $t_{inj}$.

The drive unit 14 discussed above controls the high pressure pump 12, thereby controlling fuel pressure. In order to accomplish this, a sensor 27 for detecting the current fuel pressure p is arranged in connection with the fuel distribution pipe 15. The fuel pressure sensor 27 is connected to the control unit 5 via a further connection 28 in order to deliver a measurement value corresponding to the current pressure p in the fuel distribution pipe 15.

As illustrated in FIG. 1, the sensor 27 is arranged in direct connection to the fuel distribution pipe 115. However, the sensor 27 can be arranged anywhere downstream of the high pressure pump 12 since the fuel pressure is substantially the same at all points downstream of the pump 12.

During engine operation, exhaust gases are conveyed out of the cylin3 via an exhaust manifold 29 and into an exhaust pipe 30 connected to the exhaust manifold 29. An exhaust gas catalytic converter 31 is preferably provided further downstream in the exhaust pipe 30. The catalytic converter 31 is of a known kind and will not be described in detail here. The exhaust gases from the engine 1 thus flow through the exhaust pipe 30, through the catalytic converter 31 and then on out to the atmosphere, preferably by way of a muffler or silencer 32.

The present invention further includes a sensor 33 for detecting the oxygen concentration in the exhaust gases. The sensor 33 is preferably a linear Lambda ("λ") sonde type. Alternatively, the sensor 33 is a binary sonde. The sensor 33 is connected to the control unit 5 via an electrical connection 34. The sensor. 33 is located in the exhaust pipe 30 upstream of the exhaust catalytic converter 31 and the silencer 32. In a known manner, the sensor 33 is used for generating a signal corresponding to the oxygen concentration in the exhaust gases. This signal is inputted to the control unit 5 via the connection 34, and is used in controlling the air/fuel mixture to the engine 1.

The function of the invention will now be described in detail. At relatively low torque and low speed, the engine 1 operates in a stratified mode with a very lean air/fuel mixture. At relatively high torque and high speed, the engine 1 operates in a homogeneous mode, i.e., with a stoichiometric or substantially stoichiometric mixture. Based on the current rotational speed of the engine 1 determined by the speed sensor 19, and the required torque of the engine 1, which can be detected by the gas pedal position sensor 18, the control unit 5 can determine if the engine 1 should be in the stratified or homogeneous operating mode. By doing so, the control unit 5 can determine the appropriate amount of air and fuel to be fed to the engine 1 based upon the driving situation.

The control unit 5 is utilized for adjusting the high-pressure pump 12 to a suitable pressure. For this adjustment, the current fuel pressure p is detected in the fuel distribution pipe 15. This is accomplished by means of the fuel pressure sensor 27 discussed above. Further, as previously mentioned, there is a need to determine whether the sensor 27 is functioning properly or not.

The present invention performs a predetermined, intentional modification of the fuel pressure p while simultaneously performing a predetermined, intentional modification of the injection time period $t_{inj}$. Changes in the pressure and injection time period are selected so that fuel flow to the engine remains substantially unchanged. During normal conditions, assuming the sensor 27 to be functioning properly, no modification of the control of the air/fuel mixture to the engine 1 is necessary. In other words, a review of the changes in the pressure and the injection time whether modification of the control of the air/fuel mixture to the engine 1 is necessary or not.

One modification of the current fuel pressure p corresponds to a change in the amount of injected fuel F, which is defined by the following relationship between the fuel amount F and the pressure p:

$$F = t_{inj} \cdot K \cdot E \cdot C \cdot \sqrt{p}$$

where $t_{inj}$ is the injection time period for the individual injector,

K is a constant corresponding to a measure of, among other things, the size of the injector, E is a constant error factor determined in dependence of the current temperature and control voltage to the injector in question, and C is a constant error factor determined in dependence of component variations.

The term p, which defines a measure of the current pressure, is really composed of the difference between the pressure applied onto the respective injector less the pressure $p_u$ on the outlet side of the injector in question, i.e., $\sqrt{p-p_u}$. The outlet pressure $p_u$ may, however, in this context, be considered as constant and relatively low compared to the pressure applied onto the respective injector. For this reason, the term $\sqrt{p-p_u}$ can be approximated by the term $\sqrt{p}$.

In those cases where the outlet pressure $p_u$ cannot be regarded as negligible, it can be calculated based on known values corresponding to the amount of air fed into the engine 1, obtained from the air flow meter 20, or corresponding to the speed of the engine 1, obtained from the revolution counter 19.

The terms K, E and C can be considered constants that are not changed during the diagnosis procedure. Accordingly, if the current fuel pressure p is changed, then this will correspond to a known change of the injected amount of fuel F, with the injected amount of fuel F being substantially proportional to $\sqrt{p}$.

According to the invention, a certain modification of the fuel pressure p causes a certain change of the injected amount of fuel F. This change in the amount of fuel will, according to the invention, be compensated by a corresponding modification of the injection time period $t_{inj}$, whereupon a check will be performed to determine whether a change is necessary in the control of air and fuel to the engine in order to maintain a current, expected Lambda value. If a deviation from the expected Lambda value is determined, an indication may be issued, e.g., in the form of an activated warning light 35. Such a warning light 35 would then be connected to the control unit 5 via a further connection 36, and would preferably be located in or in connection with the instrument panel of the vehicle.

The function of the invention will now be explained with reference to FIG. 2, which is a simplified flow diagram from which the function of the invention may be gathered. According to the invention, the diagnosis method can be initiated when the engine is operated at an air/fuel mixture having a Lambda value in the order of about λ=1. This is because the Lambda sensor 33 is designed for use at Lambda values of this magnitude. For this reason, the diagnosis according to the invention normally cannot be performed during stratified operation of the engine, as the engine is then fed with an air/fuel mixture having a Lambda value substantially above λ=1.

The exact range of Lambda values within which the invention can be utilized will vary depending on, among other things, the type of Lambda sensor 33 used. In normal applications, the method according to the invention can be performed at a Lambda value within the range of about 0.85 to about 1.15.

Figure 2:
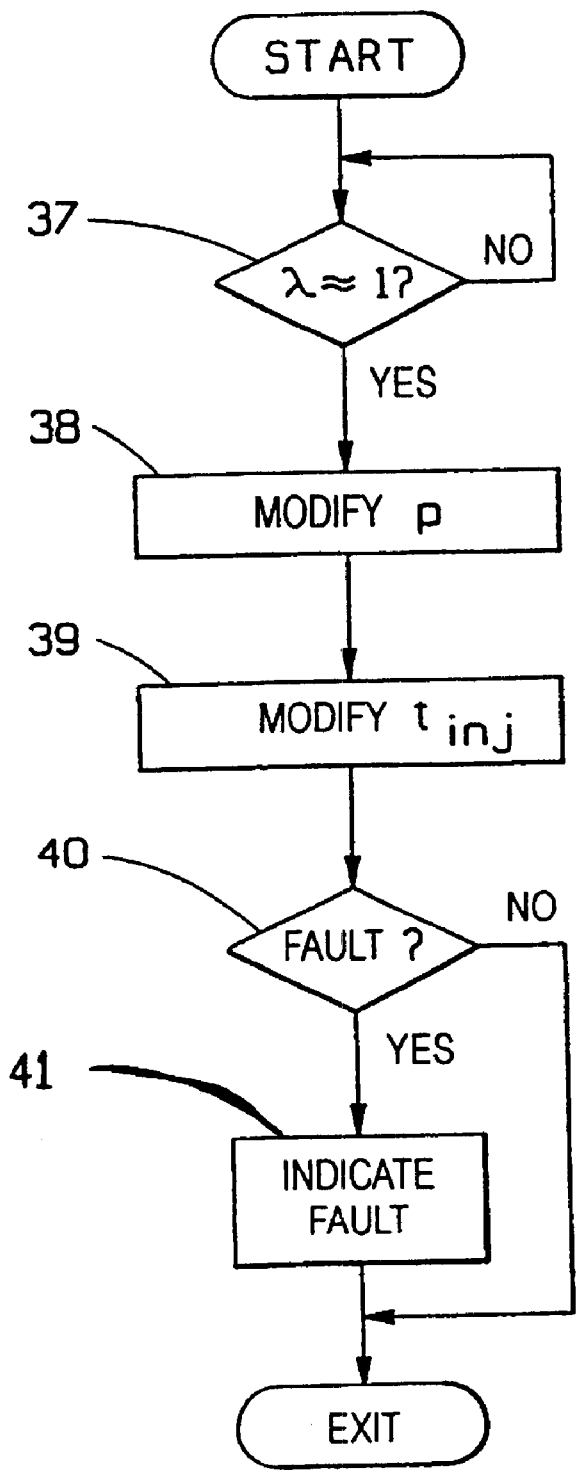
FIG. 2 is a simplified flow diagram illustrating a function of the invention.

Initially, as indicated in the decision block of FIG. 2 noted by reference number 37, the engine 1 is checked to determine whether it is operating in a suitable operating mode wherein the Lambda value, for the reasons discussed above, lies within the predetermined range of about 0.85 to about 1.15, or in the order of λ≈1. In the embodiment where the engine 1 is a DI engine, this required operating mode corresponds to the engine 1 operating homogeneously. If this is the case, the measurement signal from the Lambda sensor 33 can be used for a closed-loop Lambda control, i.e., a control of the air/fuel mixture fed to the engine 1.

Further, the diagnosis according to the invention would preferably include complementary steps for determining whether one or more certain operating state are present, e.g., whether the current speed and load of the engine are within ranges suitable for diagnosis. Furthermore, the diagnosis can additionally include steps for determining whether control of the air/fuel mixture to the engine has built up to a stable situation, for example, whether the Lambda sensor 33 has delivered a substantially constant measurement value during a certain time period. Such checking steps could be utilized for ensuring that the diagnosis is performed at suitable points in time.

If the Lambda value is found to within the predetermined range, a predetermined pressure modifications is then performed, indicated by reference number 38, in accordance with what has been explained above. In this step, the fuel pressure p is altered a certain degree or amount by controlling the high pressure pump 12 with the control unit 5. For example, the pressure modification can be done by increasing or decreasing the pressure p in the amount of, for example, 10, 20 or 30%. However, the invention is of course not limited only to this kind of pressure modifications. Here the pressure sensor 27 is used to determine whether the required pressure modification has been achieved. At the same time as the pressure change is made, a corresponding modification of the injection time period $t_{inj}$ for the respective injector is also performed as indicated by step 39. Although shown to be occurring sequentially, it should be understood that the modification of the pressure p and the injection time period $t_{inj}$ can occur concurrently, or the injection time period $t_{inj}$ modification can occur ahead of the pressure modification. As explained above, the injection time period modification is made in order to compensate for the effect upon the injected fuel amount F due to the change in pressure p.

If the function of the fuel pressure sensor 27 is intact, the amount of fuel F will remain substantially constant after the modifications of the pressure p and the injection time period $t_{inj}$. Consequently, no change in the Lambda control of the engine 1 would be expected from the two intentional disturbances. In order to determine if this is the case, a check is made in step 40 to determine if the modifications of the fuel pressure p and injection time period $t_{inj}$ have resulted in necessary change in the Lambda control of the fuel/air mixture to the engine 1. This change in control normally comprises a factor with relatively short response time, e.g., in the order of a second or two. If this "quick" control factor does not change, i.e., no compensation of the air/fuel control has been performed by the control unit 5, the sensor 27 can be regarded as intact. If this is the case, the diagnostic procedure is terminated.

However, should a deviation be detected, i.e., a modification of the Lambda control has occurred, then this is an indication of the sensor 27 being defective. In this case, a warning signal is issued in step 41 by a warning indicator such as the warning light 35 mentioned above. In this way, an indication is provided to the vehicle operator that the sensor 27 is defective.

The diagnosis method according to the invention is preferably performed at discrete points in time. This is because a DI engine operates with the Lambda control described above only on certain occasions, e.g., during homogeneous operation. The intentional modification of the pressure p and the injection time period $t_{inj}$ is preferably maintained for a few seconds, which is sufficient time for the Lambda control to build up to stable values.

As a complement to the diagnostic procedure described above, an "out of range" test could also be performed in the control unit 5. In such a test, the signal from the pressure sensor 27 is continuously compared with a highest conceivable measurement value and a lowest conceivable measurement value. If the signal from the pressure sensor 27 lies outside of this expected range, the pressure sensor 27 is considered defective.

The invention will not be limited to the embodiment discussed above, but can be varied within the scope of the accompanying claims. For example, the invention is not limited to engines of the DI type, but can also be used with other types of engine such as conventional gasoline and diesel engines. Various types of fuel-powered engines require diagnosis of a fuel pressure sensor in connection with a Lambda control. Further, the invention can be utilized with various types of vehicles such as passenger cars, trucks and buses.

According to an alternative embodiment, a measured signal pertaining to the torque of the engine could be used as reference instead of the current Lambda value. In such a case it could be determined whether a deviation in engine torque occurs in connection with a change in fuel pressure p and injection time period $t_{inj}$, i.e., an excessive torque change occurs after having modified the fuel pressure p and injection time period $t_{inj}$. Such a change in the operating state of the engine would be an indication of the fuel pressure sensor being defective.

In another embodiment, the diagnosis method according to the invention could be used with fuel pumps working at a relatively low pressure, i.e., as an alternative to high-pressure pumps used with DI engines.

The invention could also be used with engines having one high-pressure pump for each cylinder, instead of a common high-pressure pump for all the cylinders as discussed above.

Further, the invention can be used with engines based upon equally large fuel supply to all cylinders (as described above) or, alternatively, with engines having individual control of the fuel supply to each cylinder.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. A method for the diagnosis of a sensor in connection with control of a combustion engine, the method comprising the steps of:

feeding fuel under pressure to the engine, detecting the pressure with the sensor, controlling an air/fuel mixture based on the operating state of the engine, intentionally modifying the pressure, intentionally modifying the injection time period during which fuel is fed to the engine, wherein the modifications of the pressure and the injection time period are selected in such a way that substantially no change of the fuel flow to the engine is obtained, and determining whether the modifications of the pressure and injection time period result in any unallowable deviation in the operating state of the engine, wherein when an unallowable deviation occurs, issuing an indication that the sensor is defective.

2. The method according to claim 1, the check further comprising the step of determining if the modifications of the pressure and injection time period result in any unallowable deviation in the control of the air/fuel mixture fed to the engine.

3. The method according to claim 1, further comprising the step of checking whether the signal from the sensor lies within a range limited by a highest conceivable measurement value and a lowest conceivable measurement value, wherein any signal lying outside of the range indicates that the sensor is defective.

4. The method according to claim 1, further comprising the step of determining whether a suitable operating mode of the engine exists before performing the intentional modifications of the pressure and injection time period.

5. The method according to claim 4, further comprising the step of determining whether the Lambda value regarding the oxygen content of the exhausts from the engine is in the order of $\lambda \approx 1$ before performing the intentional modifications of the pressure and injection time period.

6. The method according to claim 1, wherein the indication comprises the actuation of a warning light.

7. An arrangement for the diagnosis of a sensor in connection with control of a combustion engine, the arrangement comprising a pump for feeding fuel under pressure to the engine, and a control unit for controlling an air/fuel mixture according to the operating state of the engine, the control unit operating to perform an intentional modification of the pressure and an intentional modification of the injection time period during which fuel is fed to the engine, wherein the modifications of the pressure and the injection time period are selected so that substantially no change in the flow of fuel to the engine occurs, wherein the control unit operates to determine whether the modifications of the pressure and injection time period result in any unallowable deviation in the operating state of the engine, and should an unallowable deviation occur, wherein the control unit issues an indication that the sensor is defective.

8. The arrangement according to claim 7, wherein the engine is a direct injection Otto type engine.

9. The arrangement according to claim 7, wherein the pump comprises a high pressure pump for feeding the fuel to said engine, and wherein the sensor is arranged downstream of the high pressure pump.

10. A vehicle comprising an arrangement according to claim 7.

* * * * *